(12) United States Patent
Brewer (10) Patent No.: US 12,505,064 B2
(45) Date of Patent: Dec. 23, 2025

(54) USB HUB DIGITAL CARD READER WITH VISIBLE LIGHT SOURCE SHOWING AVAILABLE-POWER INDICATOR

(71) Applicant: ProGrade Digital Incorporated, San Jose, CA (US)

(72) Inventor: Wes Brewer, Irvine, CA (US)

(73) Assignee: ProGrade Digital Incorporated, San Jose, CA (US)

( * ) Notice: Subject to any disclaimer, the term of this patent is extended or adjusted under 35 U.S.C. 154(b) by 78 days.

(21) Appl. No.: 18/715,922

(22) PCT Filed: May 11, 2023

(86) PCT No.: PCT/US2023/021866
§ 371 (c)(1),
(2) Date: Jun. 3, 2024

(87) PCT Pub. No.: WO2024/043957
PCT Pub. Date: Feb. 29, 2024

(65) Prior Publication Data
US 2025/0021512 A1   Jan. 16, 2025

Related U.S. Application Data

(60) Provisional application No. 63/399,892, filed on Aug. 22, 2022.

(51) Int. Cl.
*G06F 13/42* (2006.01)
*G06F 1/26* (2006.01)
(Continued)

(52) U.S. Cl.
CPC ........ *G06F 13/4282* (2013.01); *G06F 13/382* (2013.01); *G06F 13/4068* (2013.01); *G06F 1/26* (2013.01); *G06F 2213/40* (2013.01)

(58) Field of Classification Search
CPC ...... G06F 13/4282; G06F 1/26; G06F 13/382; G06F 13/4068; G06F 2213/40
See application file for complete search history.

(56) References Cited

U.S. PATENT DOCUMENTS

| | | | |
|---|---|---|---|
| 10,340,713 B2* | 7/2019 | Romanenko | G06F 13/4282 |
| 10,936,831 B2* | 3/2021 | Brewer | G06K 7/0021 |

(Continued)

FOREIGN PATENT DOCUMENTS

| | | |
|---|---|---|
| JP | 2025515689 A | 5/2025 |
| WO | WO-2021101574 A1 | 5/2021 |
| WO | WO-2024043957 A1 | 2/2024 |

OTHER PUBLICATIONS

"International Application Serial No. PCT/US2023/021866, International Search Report mailed Sep. 6, 2023", 3 pgs.

(Continued)

*Primary Examiner* — Tammara R Peyton
(74) *Attorney, Agent, or Firm* — Schwegman Lundberg & Woessner, P.A.

(57) ABSTRACT

Various embodiments include, for example, a combination multi-port hub including at least two first connectors, at least two second connectors, an electronic circuit to detect a power level of the at least one type of electronic device, and a visible-light source. Each of the at least two first connectors is to couple electronically to a USB-based digital-card reader. Each of the at least two second connectors is to couple electronically to at least one type of electronic device type including devices types comprising one or more host computers and a power supply. The electronic circuit is to detect a level of sourced-power available without measuring a level of current present of at least one of the at least two second connectors without measuring a current level. The visible-light source is to indicate at least a predetermined (Continued)

level of power being detected. Other devices, apparatuses, and methods are described.

19 Claims, 9 Drawing Sheets

(51) Int. Cl.
    *G06F 13/38*     (2006.01)
    *G06F 13/40*     (2006.01)

(56) References Cited

U.S. PATENT DOCUMENTS

| | | | |
|---|---|---|---|
| 11,481,303 B2 * | 10/2022 | Durante | G06F 1/206 |
| 11,609,622 B2 * | 3/2023 | Shah | H02J 7/0042 |
| 11,768,528 B2 * | 9/2023 | Blair | G06F 1/26 |
| | | | 713/2 |
| 2007/0058332 A1 | 3/2007 | Canterbury et al. | |
| 2010/0078470 A1 | 4/2010 | Dalporto | |
| 2012/0246458 A1 | 9/2012 | Jain et al. | |
| 2013/0091308 A1 | 4/2013 | Cha et al. | |

OTHER PUBLICATIONS

"International Application Serial No. PCT/US2023/021866, Written Opinion mailed Sep. 6, 2023", 4 pgs.
"European Application Serial No. 23857861.1, Response to Communication pursuant to Rules 161(2) and 162 EPC filed Jan. 8, 2025", 10 pgs.
"International Application Serial No. PCT US2023 021866, International Preliminary Report on Patentability mailed Mar. 6, 2025", 6 pgs.

* cited by examiner

USB HUB DIGITAL CARD READER WITH VISIBLE LIGHT SOURCE SHOWING AVAILABLE-POWER INDICATOR

CLAIM OF PRIORITY

This patent application is a U.S. National Stage Application under 35 U.S.C. 371 from International Application No. PCT/US2023/021866, filed 11 May 2023, and published as WO 2024/043957 on 29 Feb. 2024, which claims priority to U.S. Provisional Application Ser. No. 63/399,892, entitled, "USB HUB WITH AVAILABLE-POWER INDICATOR," filed 22 Aug. 2022; the disclosure of which are incorporated herein by reference in their entirety.

TECHNICAL FIELD

Embodiments described herein relate generally to digital memory cards and devices for writing to or reading to the memory cards. More specifically, the disclosed subject matter relates to a USB hub configured to couple at least two digital-card readers while providing an indicator verifying that there is sufficient power to simultaneously power the at least two readers. Power verification for the sufficient-power indicator does not require measuring available current being source to the at least two digital-card readers.

BACKGROUND

Digital memory-cards are known in the art and are used for storing, for example, data from cinematography, videography, and still photography. The data stored on these memory cards can comprise extremely large datasets. Many people use multiple ones of these cards concurrently in their photographic workflows.

The information described in this section is provided to offer the skilled artisan a context for the following disclosed subject matter and should not be considered as admitted prior art.

SUMMARY

This document describes, among other things, various types of techniques, methods, and mechanisms relating to verifying a sufficient power level for digital-card readers used to transfer data used in cinema, video, and photography workflows, as well as workflows in related fields. The workflows include any environment in which large volumes of data files are stored on memory cards, such as, for example, but not limited to, secure digital cards (SD) and various types of CompactFlash® cards including XQD® and CFast® cards. In various embodiments, the digital-card reader may have two or more slots into which a variety of digital cards may be inserted and read from or written to simultaneously.

More specifically, the disclosed subject matter relates to a USB hub configured to couple at least two digital-card readers while providing an indicator verifying that there is sufficient power to simultaneously power at least two readers. Power verification for the sufficient-power indicator does not require measuring available current being sourced to the digital-card readers.

In various embodiments described herein, the disclosed subject matter is a combination multi-port hub. The exemplary combination multi-port hub includes at least two first connectors, at least two second connectors, an electronic circuit to detect a power level of the at least one type of electronic device, and a visible-light source. Each of the at least two first connectors is arranged to couple electronically to a USB-based digital-card reader. Each of the at least two second connectors is arranged to couple electronically to at least one type of electronic device type including devices types comprising one or more host computers and a power supply. The electronic circuit is arranged to detect a level of sourced-power available without measuring a level of current present of at least one of the at least two second connectors. The visible-light source is to indicate at least a pre-determined level of power being detected by the electronic circuit used to power each USB-based digital-card reader electronically coupled to the combination multi-port hub.

In various embodiments described herein, the disclosed subject matter is a combination multi-port hub. The exemplary combination multi-port hub includes at least two USB-connectors, at least two second connectors, an electronic circuit to detect a power level of the at least one type of electronic device, and an indicator-light aperture formed in the combination multi-port hub and proximate to a visible-light source. Each of the at least two USB-connectors is arranged to couple electronically to a USB-based digital-card reader. At least one of the at least two second connectors is a USB-connector to include a configuration channel connection, where the configuration channel is to carry a logic level indicative of a power lever present within the USB-connector. Each of the at least two second connectors is arranged to couple electronically to at least one electronic device type including device types comprising one or more host computers and a power supply. The electronic circuit is to detect a power level without measuring a level of current present of at least one of the at least two second connectors. The visible-light source is arranged to indicate at least a pre-determined level of power being detected by the electronic circuit used to power each USB-based digital-card reader electronically coupled to the combination multi-port hub.

In various embodiments described herein, the disclosed subject matter is a method for using a combination multi-port hub. The exemplary method includes comparing a logic level of each of a first configuration channel (CC1) and a second configuration channel (CC2), received by the combination multi-port hub, to a reference voltage; and making a determination whether at least one of the CC1 and CC2 logic levels is at least equal to or greater than the reference voltage. Based on a determination that the at least one of the CC1 and CC2 logic levels is at least equal to or greater than the reference voltage; illuminating a first visible-light source on the combination multi-port hub. Based on a determination that the at least one of the CC1 and CC2 logic levels is at less than the reference voltage; illuminating a second visible-light source on the combination multi-port hub.

BRIEF DESCRIPTION OF THE DRAWINGS

In the drawings, which are not necessarily drawn to scale, like numerals describe substantially-similar components throughout the several views. Like numerals having different letter suffixes represent different instances of substantially-similar or related components. The drawings illustrate generally, by way of example, but not by way of limitation, various embodiments discussed in the present document.

DETAILED DESCRIPTION

Reference will now be made in detail to certain embodiments of the disclosed subject matter, examples of which are illustrated in part in the accompanying drawings. Other embodiments may incorporate structural, logical, electrical, process, and other changes. Portions and features of some embodiments may be included in, or substituted for, those of other embodiments. While the disclosed subject matter will be described in conjunction with the enumerated claims, it will be understood that the disclosed subject matter is not intended to limit the claims to the disclosed subject matter.

In various embodiments, the disclosed subject matter relates to digital-card readers used to transfer data used in cinema, video, and photography workflows, as well as workflows in related fields. The workflows include any environment in which large volumes (e.g., 512 GB or more) of data files are stored on memory cards, such as, for example, but not limited to, secure digital cards (SD) and various types of CompactFlash® cards including XQD® and CFast® cards. In various embodiments, the digital-card reader may have two or more slots into which a variety of digital cards may be inserted and read from or written to simultaneously.

The disclosed subject matter relates to a USB hub configured to couple at least two digital-card readers while providing an indicator for an end-user of the digital-card readers verifying that there is sufficient power to simultaneously power the at least two readers. A person of ordinary skill in the art will recognize that a single one of the digital-card readers may contain a dual reader, as described in more detail with reference to FIG. 1, below. Significantly, power verification for the sufficient-power indicator does not require measuring available current being source to the at least two digital-card readers.

Figure 1:
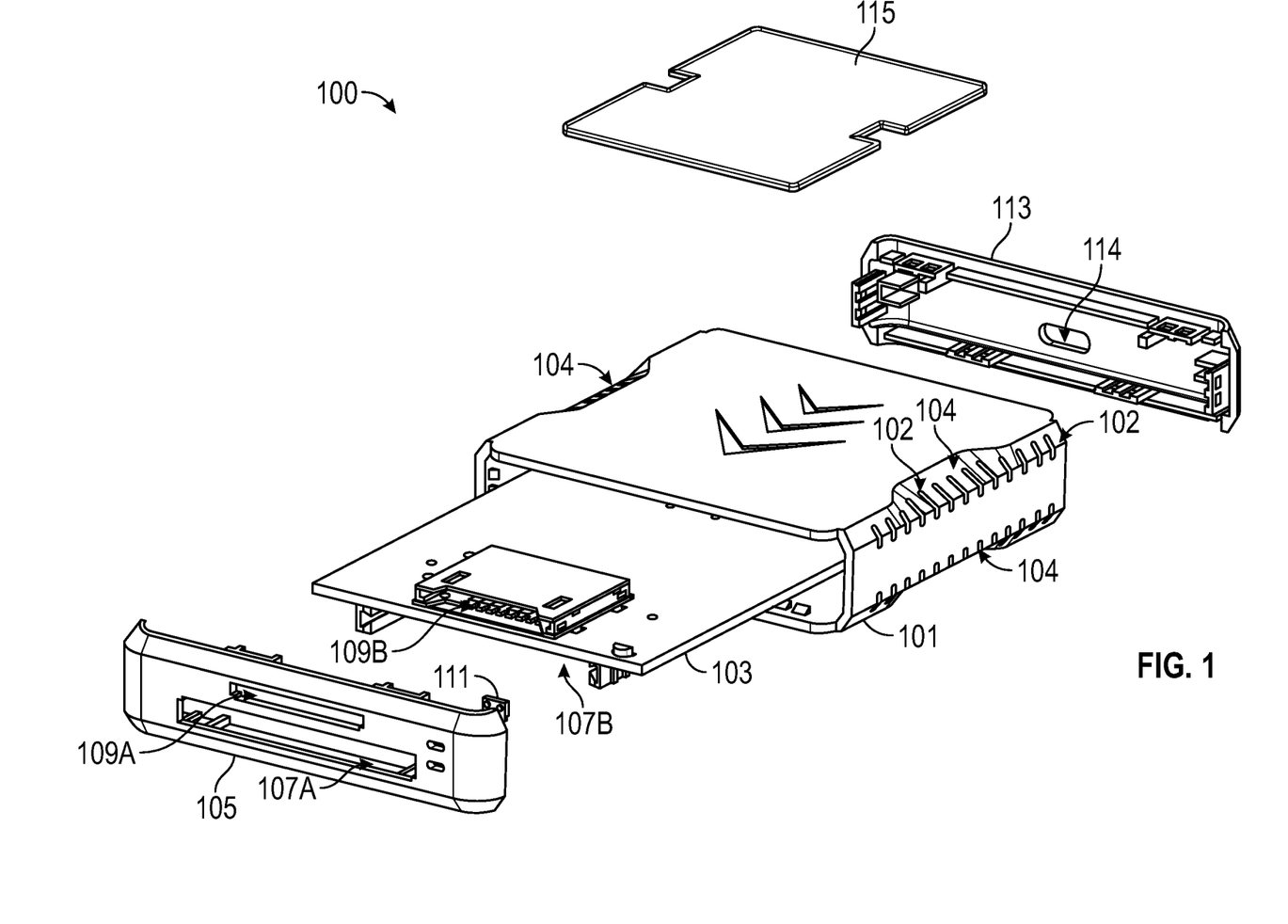
FIG. 1 shows as an exploded-view drawing of an exemplary embodiment of a USB-based digital-card reader used in accordance with various embodiments of the disclosed subject matter.

With reference now to FIG. 1 an exploded-view drawing of an exemplary embodiment of a USB-based digital-card reader 100 used in accordance with various embodiments of the disclosed subject matter is shown. The digital-card reader 100 is shown to include a card-reader frame 101, a dual card-reader circuit-board 103, a front cover 105 for the card-reader frame 101, and back cover 113 for the card-reader frame 101.

The card-reader frame 101 can be constructed from a variety of materials including, for example, metals, plastics, ceramics, and other materials known in the art. The card-reader frame 101 can be machined, extracted, cast, or otherwise fabricated from one or more materials known in the art or described herein. In various embodiments, the front cover 105 and the back cover 113 can be fabricated from materials and formation techniques similar to those used to fabricate the card-reader frame 101. In other embodiments, the front cover 105 and the back cover 113 can be fabricated from materials and formation techniques different from those to those used to fabricate the card-reader frame 101. For example, the card-reader frame 101 may be machined from type 304 stainless steel while the front cover 105 and the back cover 113 may be formed from a thermosetting polymer (e.g., a thermosetting plastic or a thermosetting resin). Once formed with the dual card-reader circuit-board 103 inserted within the card-reader frame 101, each of the card-reader frame 101, the front cover 105, and the back cover 113 may be attached to one another by, for example, mechanical components (e.g., screws, rivets, or bolts), by chemical-bonding techniques (e.g., adhesive bonding), brazing, welding, or other techniques known in the art that are suitable based at least on the materials from which the components are formed.

The card-reader frame 101 includes a number of through-hole vents 102 to allow convective cooling of the dual card-reader circuit-board 103. A person of ordinary skill in the art will recognize, based upon reading and understanding the disclosure provided herein, that a convective cooling load, and thereby a number and size of the through-hole vents 102, can be calculated based on a pre-determined heat load generated by the dual card-reader circuit-board 103 in various operating conditions and various ambient environments typically encountered. The calculations can readily be performed based on principles of heat transfer and thermo-dynamics, known in the art.

The card-reader frame 101 also includes a number of gripping indents 104. The gripping indents 104 allow an end-user to grasp more readily the digital-card reader 100 when picking up and moving the digital-card reader 100, or separating the digital-card reader 100 from another surface to which the digital-card reader 100 has been attached magnetically.

Although FIG. 1 indicates that there are two memory-card readers, the dual card-reader circuit-board 103 term is chosen merely to illustrate more readily an exemplary embodiment of the digital-card reader 100. In various embodiments, the dual card-reader circuit-board 103 may include at least one or more memory-card readers configured to perform data transfer operations. The data transfer operations include at least one of reading from the memory card and writing to the memory card.

In various embodiments, the back cover 113 may include an opening 114 through which a computer or other digital device, such as a power hub, described to reference to FIGS. 2, 3A, and 3B, below, may be electrically coupled to the dual card-reader circuit-board 103 within the digital-card reader 100. Although only one opening 114 is shown, the skilled artisan will recognize that any number of openings 114 may be formed through the back cover 113. The opening 114 allows access from the dual card-reader circuit-board 103 to, for example, an electrical bus, such as a universal serial bus (USB, including, e.g., USB-A and USB-C") to be coupled electrically to an external electronic device, such as a laptop or desktop computer, or a digital camera (e.g., a video camera, a digital single-lens reflex (DSLR) camera, a mirrorless camera, etc.).

In some embodiments (not shown but understandable to a skilled artisan), there may be no direct connections between a computer or other digital device and the digital-card reader 100. For example, rather than having a direct, hardwired electrical-connection between the computer or other digital device, the digital-card reader 100 and the computer may be coupled wirelessly via, for example, radio-frequency (RF), Bluetooth®, or one or more other types of wireless communication means known in the art.

In various embodiments, the front cover 105 has a number of through-holes including a first through-hole 107A and a second through-hole 109A. Although the first through-hole 107A is shown to be larger than the second through-hole 109A, there is no requirement for such an arrangement. Nor is there any requirement for precisely two through-holes. For example, there may be only a single through-hole or more than two through-holes. In various embodiments, each of the through-holes 107A, 109A may be the same size. In other embodiments, the through-hole 107A may be smaller than the through-hole 109A. Regardless of their number and relative sizes, each of the through-holes 107A, 109A is positioned to align with a first card-reader 107B (not shown explicitly) and a second card-reader 109B, both located on the dual card-reader circuit-board 103.

In various embodiments, the dual card-reader circuit-board 103 includes two card readers. Each of the card readers may be configured to read the same or different types and sizes of memory card (e.g., one card reader may be configured to read a CFast® card and the other may be configured to read an XQD® card). In other embodiments, both card readers may be configured to read, for example, XQD® cards or other types of memory cards. In other embodiments, not shown but understandable to a person of ordinary skill in the art based on upon reading and understanding the disclosure provided herein and despite the name given for ease of understanding, the dual card-reader circuit-board 103 may include more than two card readers.

In embodiments where the card-reader frame 101 is not fabricated from a ferrous material (e.g., a magnetic material), an optional metal plate 115 may be fastened or otherwise adhered to an uppermost portion of the card-reader frame 101 in order to stack multiple ones of the digital-card reader 100, one atop another or to another surface. In various embodiments, the optional metal plate 115 may be fastened to the card-reader frame 101 by various types of mechanical fasteners as described herein and as are known to a skilled artisan. In other embodiments, optional metal plate 115 may be adhered to the card-reader frame 101 by chemical means, such as adhesive surfaces or other adhesive materials.

In other embodiments, the optional metal plate 115 may comprise any one or more of a number of magnetic materials known in the art. For example, the optional metal plate 115 may comprise ceramic magnets, aluminum/nickel/cobalt (Alnico) magnets, rare-earth magnets. or other types of magnets known in the art.

Figure 2:
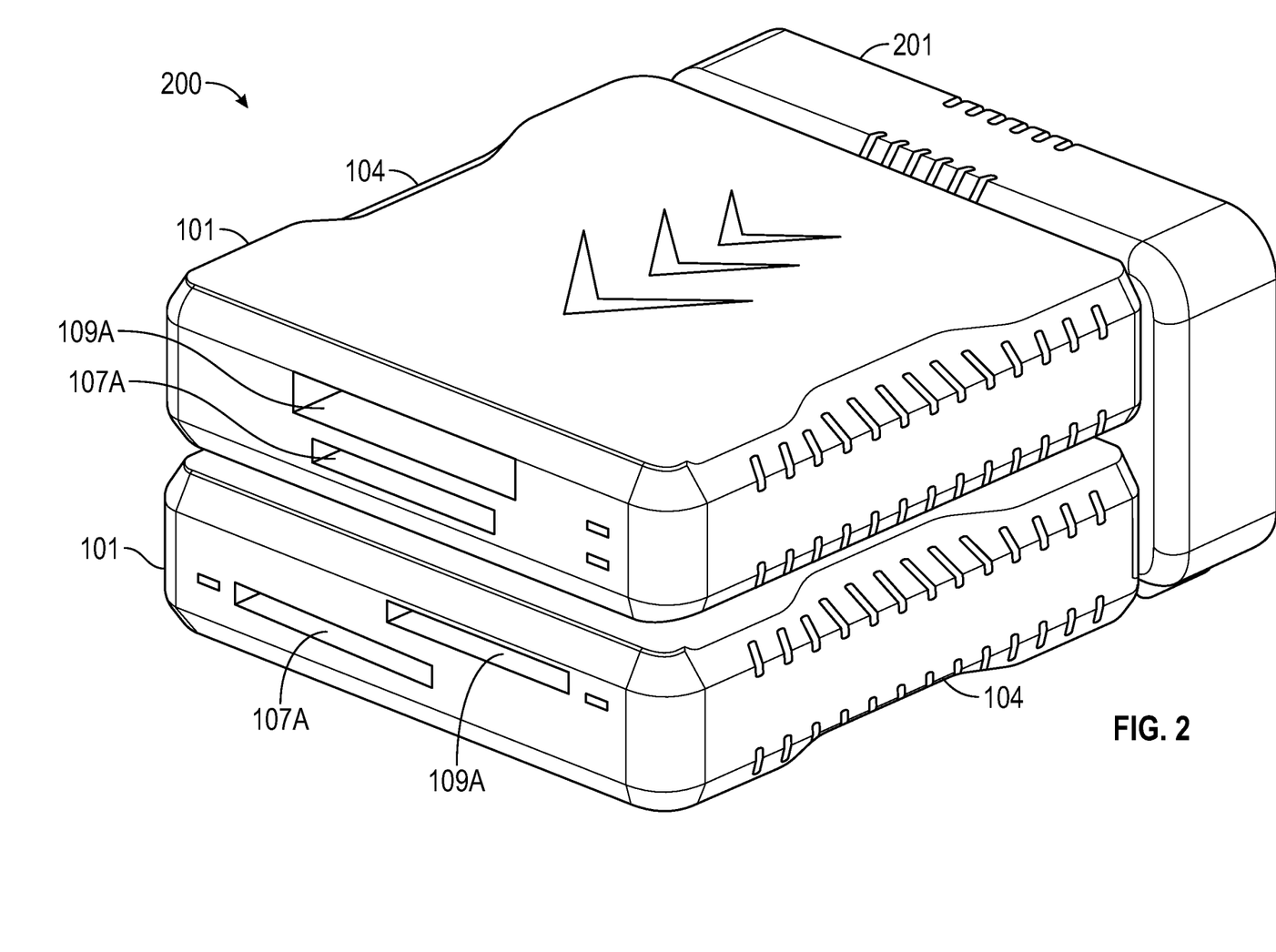
FIG. 2 shows a perspective view of FIG. 2 shows a perspective view of two exemplary digital-card readers and a combination multi-port hub with the combination multi-port hub being arranged to supply power to and read data from multiple ones of a USB-based digital-card reader, similar to or the same as the digital-card reader described in FIG. 1.

FIG. 2 shows a perspective view 200 of two exemplary digital-card readers and a combination multi-port hub 201. The combination multi-port hub 201 is arranged to supply power to and read data from (or supply data to) multiple ones of a USB-based digital-card reader, such as the digital-card reader 100 described in FIG. 1. Consequently, the USB-based digital-card reader may be similar to or the same as the digital-card reader 100 of FIG. 1. In FIG. 2, the combination multi-port hub 201 is based on, for example, the Universal Serial Bus (USB) Type-C Cable and Connector Specification, described in more detail, below.

The combination multi-port hub 201 may be formed from materials the same as or similar to one or more of the materials described above to form the digital-card reader 100. Such materials include, for example, metals, plastics, ceramics, and other materials known in the relevant art.

Figure 3A:
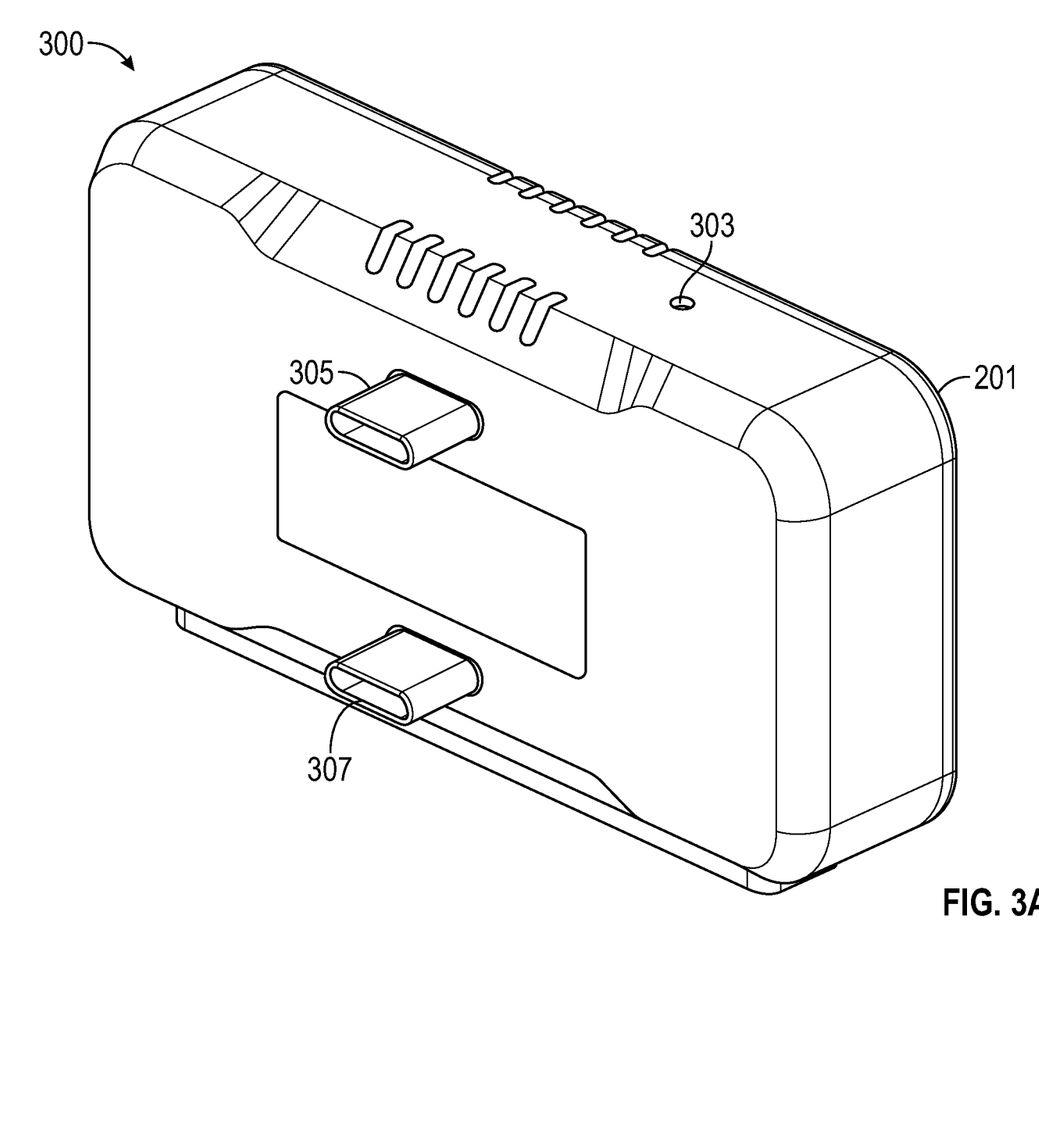
FIG. 3A shows a perspective view of a front-side view of the exemplary combination multi-port hub of FIG. 2.

FIG. 3A shows a perspective view of a front-side view 300 of the combination multi-port hub 201 of FIG. 2. As shown in FIG. 3A, the combination multi-port hub 201 includes a first USB male-connector 305 (e.g., a USB plug), a second USB male-connector 307 (e.g., a second USB plug), and an indicator-light aperture 303.

Each of the first USB male-connector 305 and the second USB male-connector 307 is arranged to provide a separate electrical coupling point to respective ones of the USB-based digital-card reader as shown in FIG. 2. The first USB male-connector 305 and the second USB male-connector 307 provide both digital-data paths and power-delivery to each of the USB-based digital-card readers coupled, respectively, thereto. Examples of electrical schematics providing the digital-data paths and the power-delivery circuitry are described below with reference to FIGS. 4 and 5A through 5C.

Although only two of the USB male-connectors are shown, no such limitation is intended. The two USB male-connectors are shown merely as a means to illustrate portions of the disclosed subject matter.

The indicator-light aperture 303 is open to a light source (not shown explicitly in FIG. 3A but described in detail below with reference to FIG. 4 and FIG. 5C). The light source is located either beneath or within the indicator-light aperture 303. Consequently, the light source is proximate to the indicator-light aperture 303 in either location of beneath or within the indicator-light aperture 303 as is understandable to a person of ordinary skill in the art. The light source may comprise any type of visible-light (e.g., from a wavelength of about 400 nm to about 700 nm) indicator. For example, the light source may comprise a halogen light source, a tungsten light source, or an LED light source. The light source that is proximate to the indicator-light aperture 303 may provide different colors, depending on whether sufficient power is provided to at least one of the USB-based digital-card readers. Although not shown explicitly, two or more instantiations of the indicator-light aperture 303 may be used, where, for example, one of the indicator-light apertures 303 can be proximate a green-color light source and the second of the indicator-light apertures 303 can be proximate a red-color light source as needed to indicate a power level received by the combination multi-port hub 201.

In a specific exemplary embodiment, the light source proximate to the indicator-light aperture 303 may provide a red color if there is insufficient power provided for the USB-based digital-card readers and a green color if sufficient power is provided for the USB-based digital-card readers. In embodiments, a sufficient power level may be considered to be at about 3.0 A at 5 V, or about 15 watts. In the case of the sufficient power being received by the combination multi-port hub 201, the light source proximate the indicator-light aperture 303 provides a green color in various embodiments.

Figure 3B:
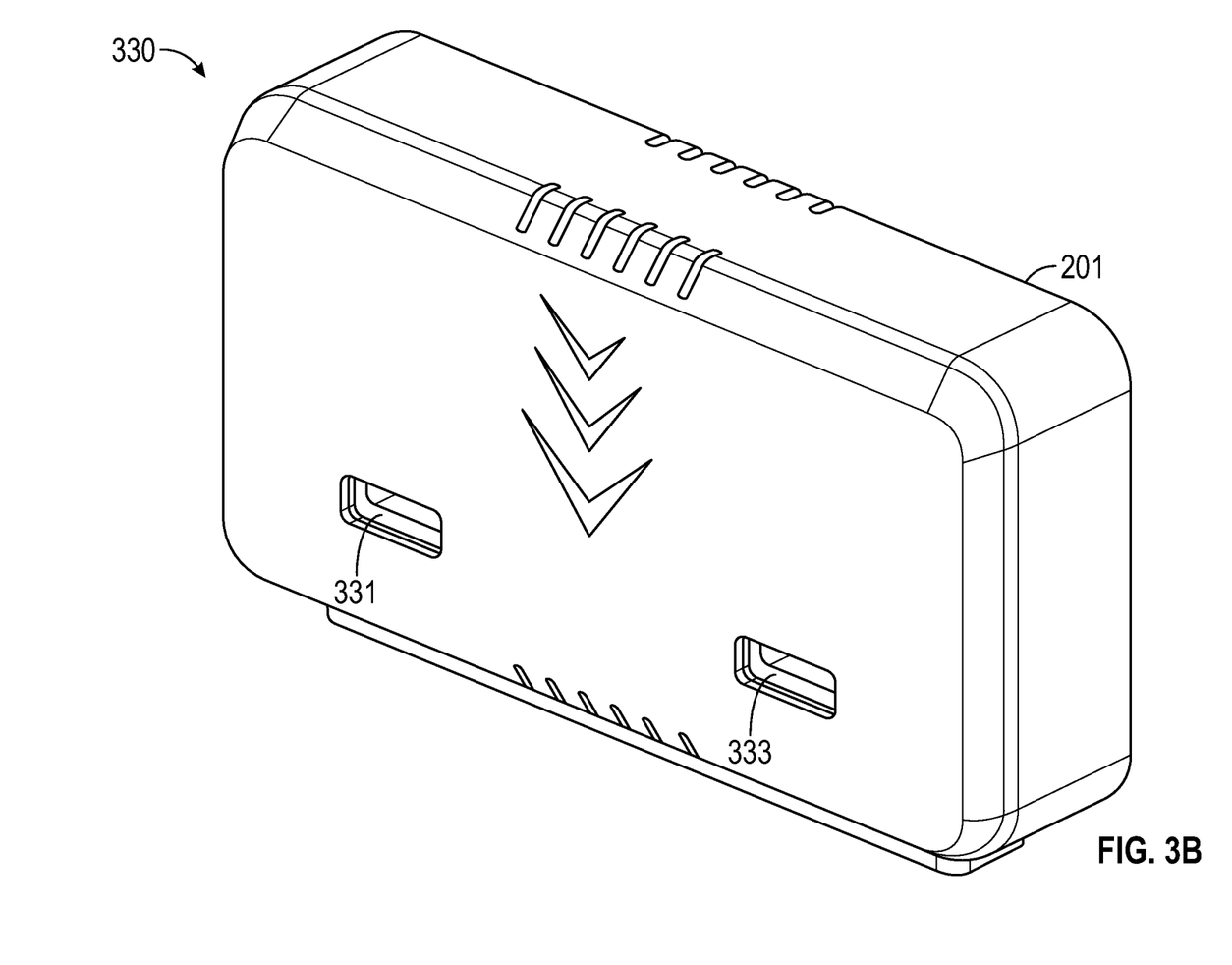
FIG. 3B shows a perspective view of a back-side view of the exemplary combination multi-port hub of FIG. 2.

FIG. 3B shows a perspective view of a back-side view 330 of the combination multi-port hub 201 of FIG. 2. As shown in FIG. 3B, the combination multi-port hub 201 includes a first USB female-connector 331 (e.g., a USB receptacle) and a second USB female-connector 333 (e.g., a second USB receptacle). However, there is no limitation requiring either plugs or receptacles as indicated. The plugs and receptacles may be interchanged in certain embodiments. Therefore, the terms referring to pugs and receptacles are provided merely so that a person of ordinary skill in the art will more readily understand embodiments of the disclosed subject matter. Additionally, at least one of the connectors 331, 333 may comprise another type of connector other than a USB connector. Such a connector (e.g., a two-pin receptacle or port) may be used to provide supplemental power to the combination multi-port hub 201 as described below in more detail with reference to for example, FIG. 5B.

The indicator-light aperture 303 of FIG. 3A is not shown simply to prevent obscuring other portions of the drawing. A person of ordinary skill in the art will recognize that, for example, USB cables may be coupled to the first USB female-connector 331 and the second USB female-connector 333 (e.g., a second USB receptacle). In embodiments, the USB cables, in turn, may couple the combination multi-port hub 201 to one or more host computers. In other embodiments, a first USB cable may couple data and power to the combination multi-port hub 201 while a second USB cable (e.g., coupled to the second USB female-connector 333 to, for example, a supplemental 5 volt DC power supply as described with reference to FIG. 4, below.

Figure 4:
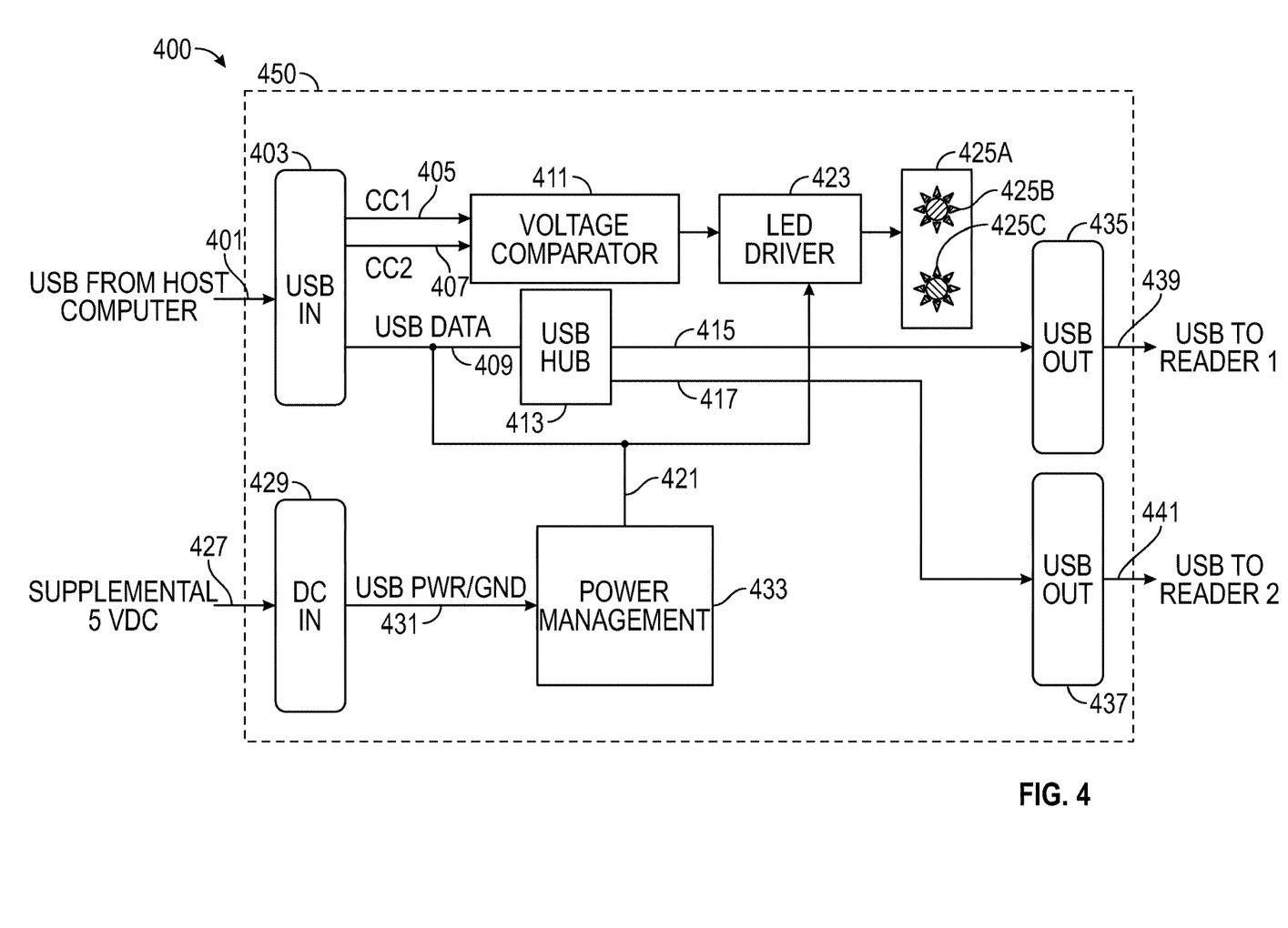
FIG. 4 shows an exemplary logic diagram for the combination multi-port hub of FIG. 2.

FIG. 4 shows an exemplary logic diagram 400 for the combination card-reader and reader and power hub 201 of FIG. 2. Consequently, the combination card-reader and reader and power hub 201 may be the same as or similar to a combination card-reader and reader and power hub 450 of FIG. 4. In various embodiments, differences and configurations between the combination multi-port hubs 201, 450 are described in detail below.

FIG. 4 is shown to include a first USB port 403, a second port 429 (e.g., a second USB port), a first USB output port 435, and a second USB output port 437. The first USB port 403 and the second port 429 may be the same as or similar to the first USB female-connector 331 and the second USB female-connector 333, respectively, of FIG. 3B. The first USB output port 435 and the second USB output port 437 may be the same as or similar to the first USB male-connector 305 and the second USB male-connector 307, respectively, of FIG. 3A. In embodiments, the second port 429 may comprise a two-pin coupling plug or receptacle rather than a USB connector.

The first USB port 403 may be coupled, for example, via a USB cable 401, to a host computer (e.g., desktop, laptop, tablet, etc.) to receive data from, or supply data to, one or more digital-card readers, such as the USB-based digital-card reader 100 of FIG. 1, via data/power lines 439, 441 (e.g., internal to the first USB output port 435 and the second USB output port 437).

With continuing reference to FIG. 4, a first configuration channel 405 (CC1), is coupled from the first USB port 403 to a voltage comparator 411. Similarly, a second configuration channel 407 (CC2), is coupled from the first USB port 403 to the voltage comparator 411. Configuration Channels (CC), as defined by the Universal Serial Bus (USB) Type-C Cable and Connector Specification, are used in the discovery, configuration, and management of connections across a USB Type-C cable. While the USB Type-C interconnect no longer physically differentiates plugs on a cable by being an A-type or B-type, the USB interface still maintains such a host-to-device logical relationship. Determination of the host-to-device relationship is accomplished through the Configuration Channel (CC) that is connected through the cable. In addition, the Configuration Channel is used to set up and manage power. Using the Configuration Channel, the USB Type-C interconnect defines a simplified 5 volt $V_{BUS}$-based power delivery and charging solution. Two pins on the USB Type-C receptacle, CC1 and CC2, are used for these power delivery purposes.

Using the USB Type-C connector solution, a source (e.g., a host or downstream hub port) may implement higher source current over $V_{BUS}$ to enable faster charging of mobile devices or higher-power devices, such as one or more of the USB-based digital-card readers 100 of FIG. 1. Since USB host and hub ports advertise via the CC pins a level of current that is presently available as a logic level, there is no need to determine a current level of the first configuration channel 405 (CC1) or the second configuration channel 407 (CC2). A logic level (e.g., voltage level) carried on the first configuration channel 405 (CC1) and the second configuration channel 407 (CC2) provides an indication of the current level available (with all current being supplied on a USB connector at the presently-defined voltage level of 5.0 volts). The USB device port can therefore manage a load to stay within a current level offered by the host or the hub, including dynamically scaling back the load if the host or hub port changes its advertisement to a lower level as indicated over the CC pins.

Currently, three current level advertisements at a 5 V $V_{BUS}$ are defined by USB Type-C current:
A default value is the as-configured for high-power operation current value as defined by a USB Specification (500 mA for USB 2.0 ports, and 900 mA or 1,500 mA for USB 3.2 ports operating in single-lane or dual-lane, respectively);
USB Type-C current at 1.5 A; and
USB Type-C current at 3.0 A.

The USB Type-C Current at either 1.5 A or 3.0 A is primarily intended for charging applications according to the USB specification. A sink can vary its current draw up to the advertised limit. Offering USB Type-C Current at either 1.5 A or 3.0 A is allowed for a host providing bus power to a device.

As indicated above, the logic level (e.g., voltage level) carried on the first configuration channel 405 (CC1) and the second configuration channel 407 (CC2) indicates the current level (e.g., about 1.5 A, or about 7.5 W at 5 V; or about 3.0 A, or about 15 W at 5 V). Therefore, there is no need to determine the actual current present at the first USB port 403. The voltage comparator 411 can be coupled to a reference voltage (not shown in FIG. 4 but described in detail with reference to FIG. 5A, below) to determine whether either or both of the logic level (e.g., voltage level) carried on the first configuration channel 405 (CC1) and the second configuration channel 407 (CC2) are either at or above, or below, a predetermined reference-voltage.

An output from the voltage comparator 411 is then transferred to an LED driver 423. An output signal from the LED driver 423 is then transferred to an LED indicator-light block 425A. Depending upon whether the output from the voltage comparator 411 is at or above, or alternatively below, the reference voltage, one of two LED indicator-lights will illuminate. For example, if the output from the voltage comparator 411 is at or above the reference voltage, a first LED 425B (e.g., green) will illuminate. If the output from the voltage comparator 411 is below the reference voltage, a second LED 425C (e.g., red) will illuminate, thereby indicating whether a sufficient power level (e.g., about 15 W) is available. Either the first LED 425B or the second LED 425C will be visible through or on the indicator-light aperture 303 of the combination multi-port hub 201 of FIG. 3A. In various embodiments, as understandable to a person of ordinary skill in the art upon reading and understanding the disclosed subject matter, the first LED 425B and the second LED 425C may comprise a single multi-color LED.

Further, although not described in detail herein, a person of ordinary skill in the art, upon reading and understanding the disclosed subject matter, will recognize that a logic circuit (e.g., a combination of NAND and NOR gates) may also be used to determine whether the logic levels present on CC1 and CC2 are at or above, or below, a predetermined reference-voltage. As known to the person of ordinary skill in the art, such a logic circuit may be constructed through the use of a Karnaugh map, in accordance with the power indicator truth table, shown below in Table I.

TABLE I

Power Indicator Truth Table

| CC1 | CC2 | DC IN | Enable Green LED | Enable Red LED |
|---|---|---|---|---|
| 0 | 0 | 0 | 0 | 1 |
| 0 | 0 | 1 | 1 | 0 |
| 0 | 1 | 0 | 1 | 0 |
| 0 | 1 | 1 | 1 | 0 |
| 1 | 0 | 0 | 1 | 0 |
| 1 | 0 | 1 | 1 | 0 |
| 1 | 1 | 0 | 1 | 0 |
| 1 | 1 | 1 | 1 | 0 |

Continuing now with FIG. 4, USB data are received from or delivered to the first USB port 403 to and from a first and second digital-card reader through a first data line 415 and a second data line 417, respectively, through a USB hub 413.

Power may optionally be received from a supplemental 5 VDC source on line 427 at the second port 429. Both USB power (e.g., 5.0 V at 3.0 A) may be supplied on power lines 431 and received at a power management block 433. The power management block 433 may provide various types of management such as voltage regulation, power switching, pull-up resistors (e.g., to $V_{BUS}$), and voltage rectification if needed (e.g., if the supplemental 5 V supply is, for example, AC or contains DC ripple current). An output 421 of the power management block 433 can be supplied as, for example, an input to the USB hub 413 and to the LED driver 423.

Figure 5A:
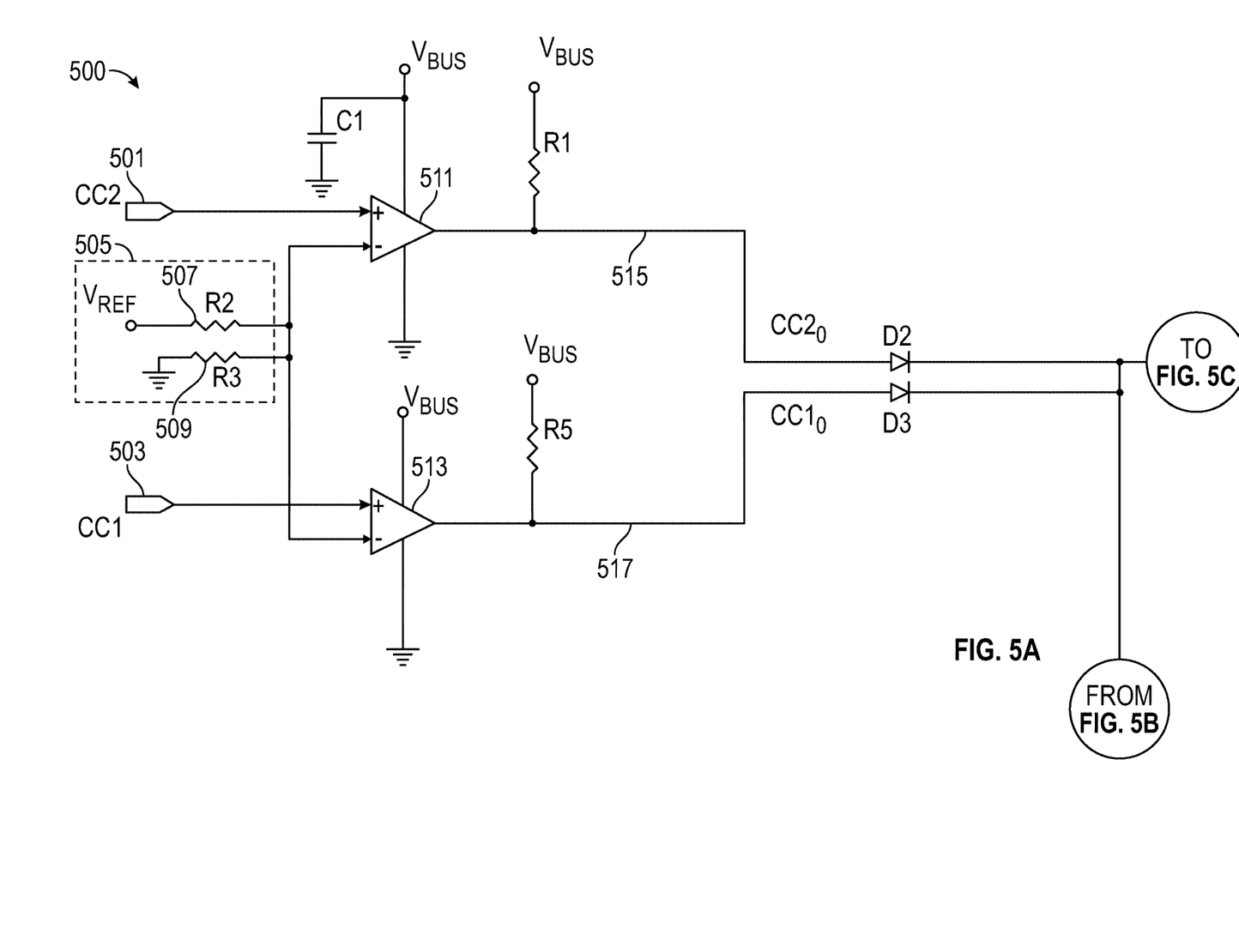
FIG. 5A shows an exemplary schematic of a comparator circuit for the combination multi-port hub of FIG. 2.

With continuing reference to the exemplary embodiment of the logic diagram 400 FIG. 4, FIG. 5A shows an exemplary schematic of a comparator circuit 500 for the combination multi-port hub 201 of FIG. 2. Logic levels of the configuration channels, CC1 and CC2, are input at a first CC input 501 and a second CC input 503, respectively. The first CC input 501 and the second CC input 503 are coupled to first inputs of a first voltage comparator 511 and second voltage comparator 513, respectively. The voltage comparators 511, 513 may comprise operational amplifiers (op-amps) or a logic circuit, as described above with reference to FIG. 4.

A voltage reference circuit 505 provides a predetermined-voltage level (e.g., 3.3 volts) to second inputs on the first voltage comparator 511 and second voltage comparator 513. The predetermined-voltage level may be obtained through, for example, a voltage divider circuit comprising a first resistor 507 and a second resistor 509. A person of ordinary skill in the art will recognize that other types of passive and active linear circuits may be used as well to provide the predetermined-voltage level. An output from the voltage comparators is provided to an LED driver circuit and LED indicators as described above and described in more detail below with reference to FIG. 5C.

In various embodiments, pull-up resistors R1 and R5, on a downstream facing port (DFP), may be coupled to both CC1 and CC2 inputs 501, 503 as shown. The pull-up resistors, R1 and R5, can be used to pull up the voltage on the voltage comparator out lines, 515, 517, to 5 V if needed or desired. A value of the pull-up resistor selected advertises the current supplying capability of the port to the device. For example, per the USB Type-C™ specification, a DFP pull-up resistor of about 10 kΩ can supply a power level of about 3.0 A at 5 V.

An upstream facing port (UFP, not shown explicitly in FIG. 5A) couples a pull-down resistor to ground, or optionally to a voltage clamp to both CC1 and CC2 inputs 501, 503. A nominal value for a pull-down resistor is about 5.1 kΩ for either 1.5 A at 5 V or 3.0 A at 5V for a USB Type-C power supply.

Figure 5B:
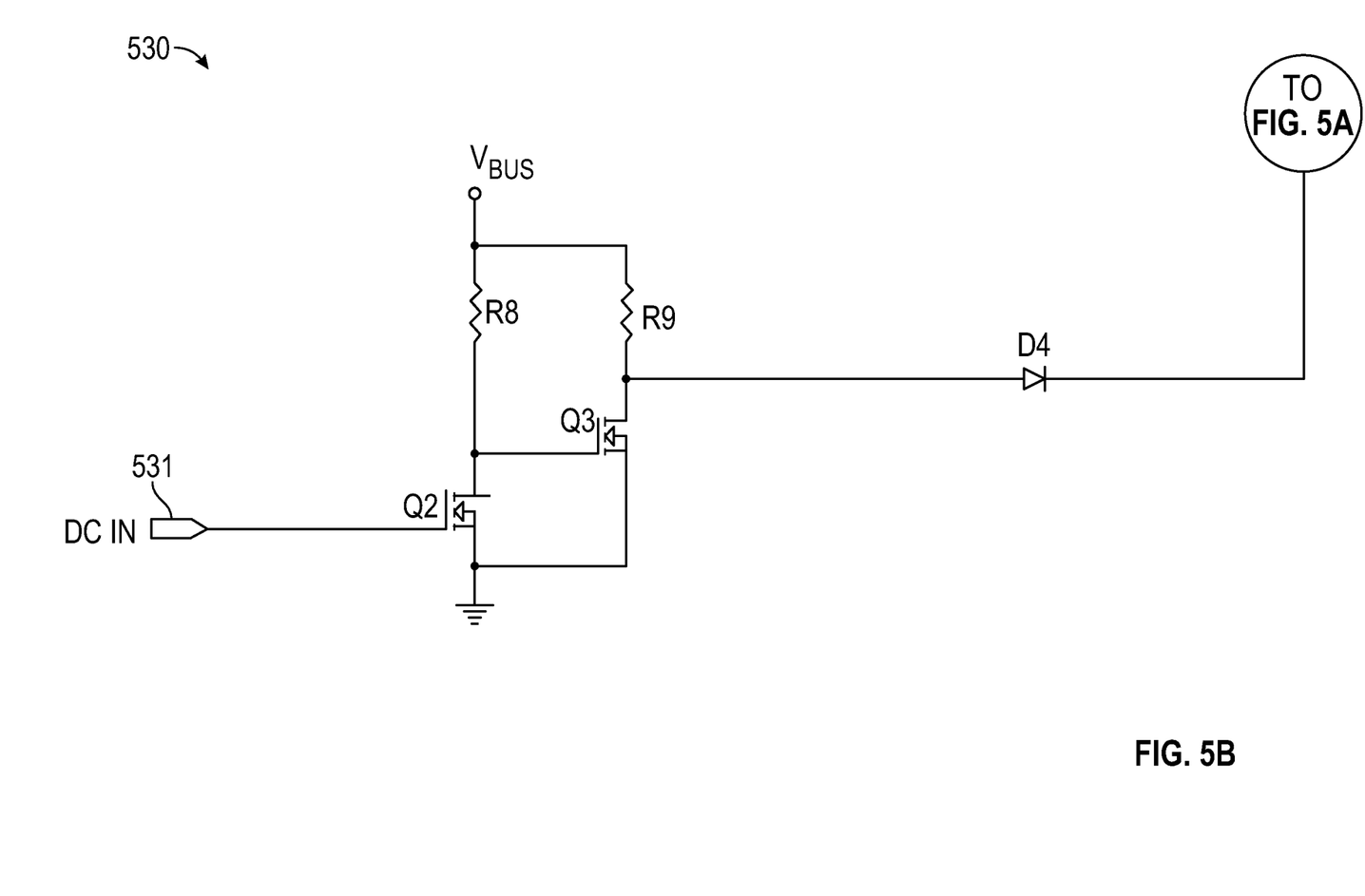
FIG. 5B shows an exemplary schematic of a supplemental-power circuit for the combination multi-port hub of FIG. 2.

FIG. 5B shows an exemplary schematic 530 of a supplemental-power circuit for the reader and power hub 201 of FIG. 2. A 5 volt external power-supply, rated to source at least about 3 amps, can be coupled to an input 531. Alternatively, the input 531 can accept, for example, an input either less than 5 V and/or an AC voltage, as described above with reference to FIG. 4. Regardless of the source current, voltage, and type of input of the input 531, the supplemental-power circuit provides an output from FIG. 5B to FIG. 5A of at least 3.0 A at 5 V. The input 531 can provide additional power if needed to source at least about 3 A if the configuration channels of FIG. 5A do not provide the 3 A to power 15 W devices. As described below, a flowchart of FIG. 6 provides more information regarding the process.

Figure 5C:
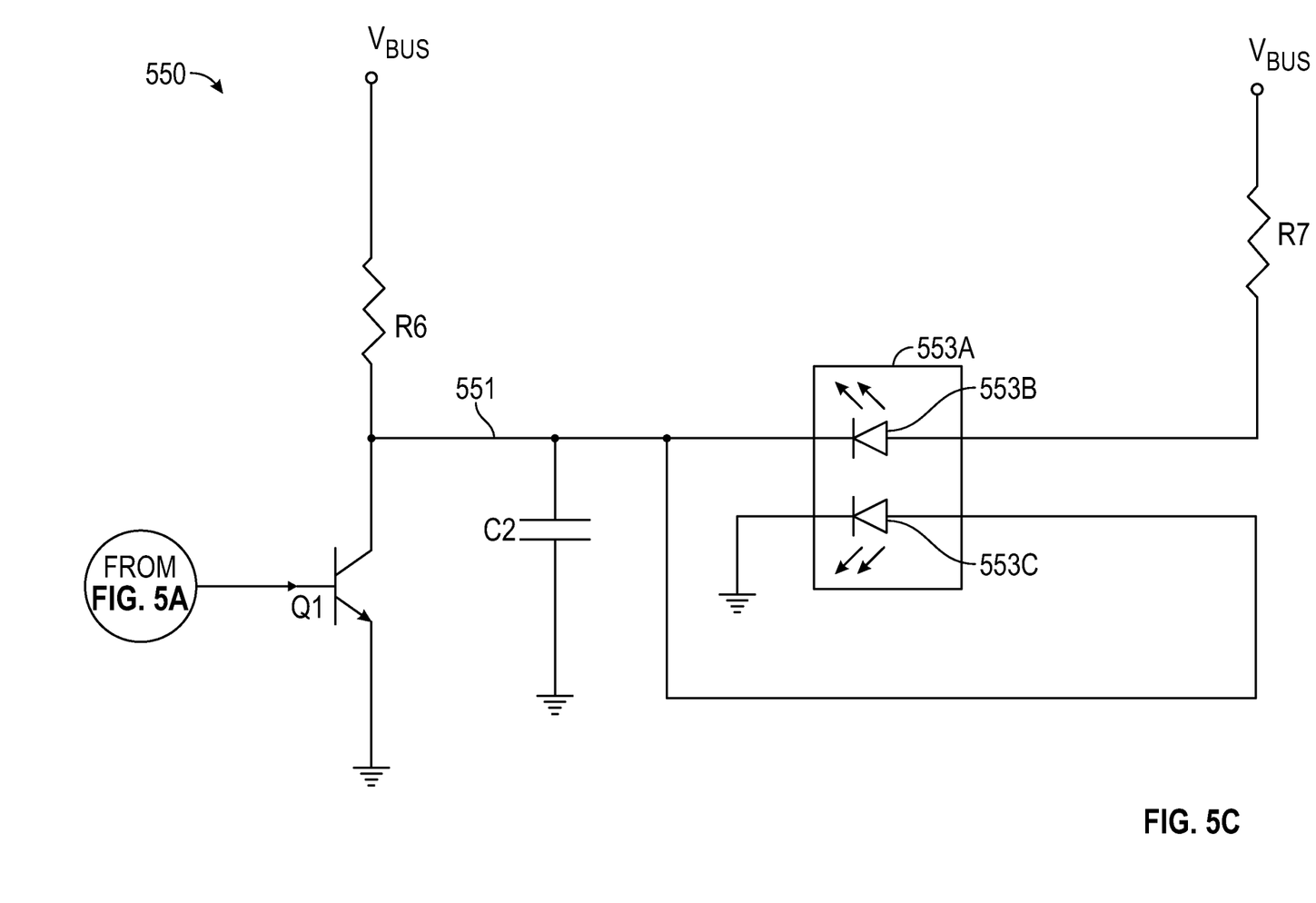
FIG. 5C shows an exemplary schematic of an available-power circuit and indicator for the combination multi-port hub of FIG. 2.

FIG. 5C shows an exemplary schematic 550 of an available-power circuit and indicator for the multi-port hub 201 of FIG. 2. A output from the voltage comparators 511, 513 is transferred on signal line 551 to an LED indicator-light block 553A. Depending upon whether the output from the voltage comparators 511, 513 (see FIG. 5A) is at or above, or alternatively below, the reference voltage, one of two LED indicator-lights will illuminate. For example, if the output from at least one of the voltage comparators 511, 513 is at or above the reference voltage, a first LED 553B (e.g., green) will illuminate. If the output from both of the voltage comparators 511, 513 is below the reference voltage, a second LED 553C (e.g., red) will illuminate. Either the first LED 553B or the second LED 553C will be visible through or on the indicator-light aperture 303 of the combination multi-port hub 201 of FIG. 3A.

Figure 6:
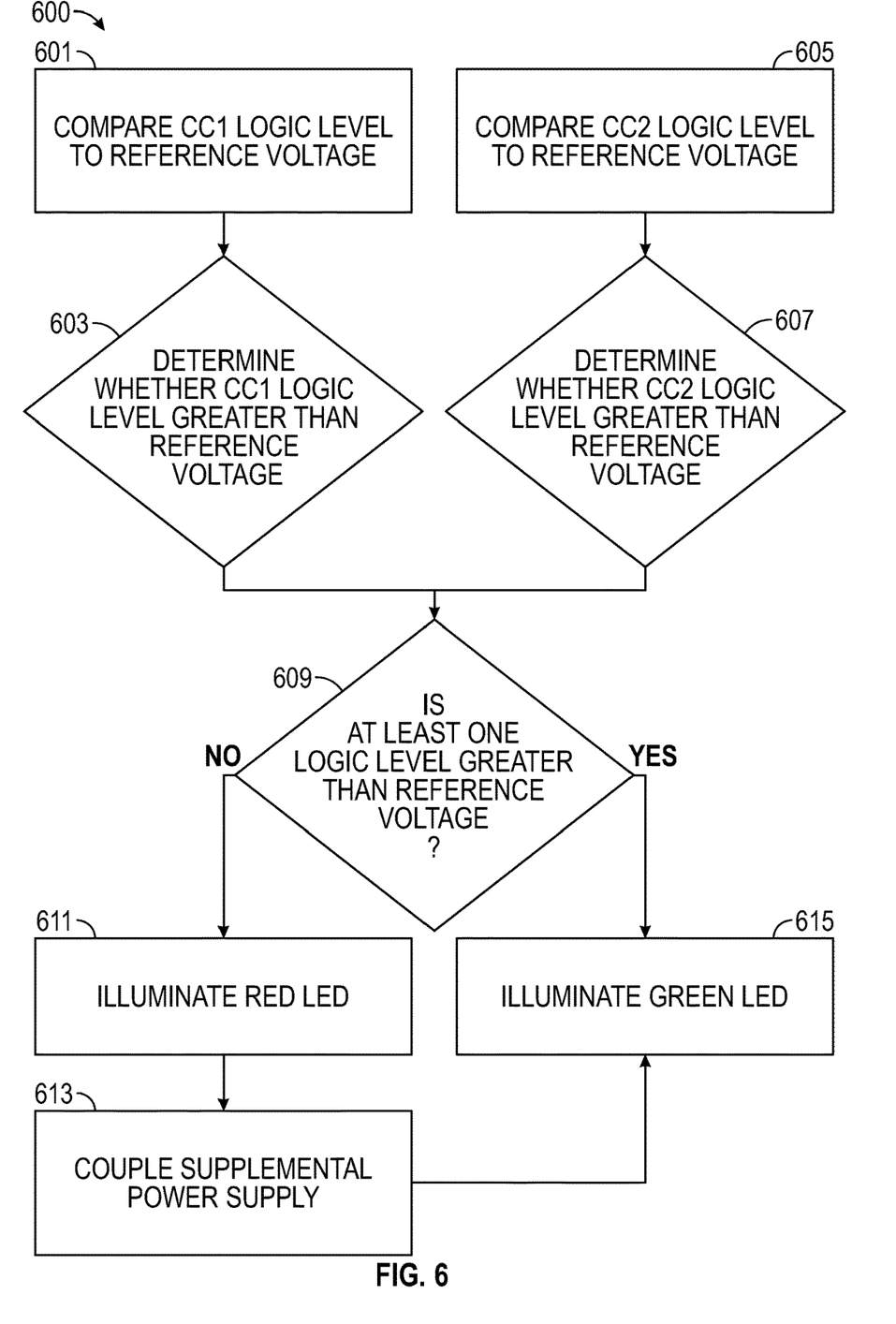
FIG. 6 shows a flowchart of an exemplary embodiment of a method for using the combination multi-port hub of FIG. 2 in accordance with various embodiments.

FIG. 6 shows a flowchart 600 of an exemplary embodiment of a method for using the combination multi-port hub 201 of FIG. 2 in accordance with various embodiments. With continuing reference to the exemplary embodiment of the logic diagram 400 FIG. 4 and/or the exemplary schematics of FIGS. 5A through 5C, at operation 601, the CC1 logic level is compared to a predetermined reference-voltage. A determination is made at operation 603 whether the CC1 logic level is at or greater than the predetermined reference-voltage.

In a similar fashion, at operation 605, the CC2 logic level is compared to a predetermined reference-voltage. A determination is made at operation 607 whether the CC2 logic level is at or greater than the predetermined reference-voltage.

At operation 609, a determination is made whether at least one logic level, CC1 or CC2, is at or greater than the predetermined reference-voltage. If the determination is made that at least one logic level, CC1 or CC2, is at or greater than the predetermined reference-voltage, a green LED is illuminated at operation 615.

If the determination is made that at least one logic level, CC1 or CC2, is less than the predetermined reference-voltage, a red LED is illuminated at operation 611. The red LED being illuminated provides a signal to an end-user of the USB hub with available power indicator to couple a supplemental power supply at operation 613 to the combination multi-port hub 201 of FIG. 2. After the supplemental power supply is coupled, the green LED is illuminated at operation 615.

Based upon reading and understanding the disclosure provided herein, a person of ordinary skill in the art will recognize a number of other configurations of the combination multi-port hub 201 are possible. Each of the other possible configuration are within a scope of the appended claims. Therefore, the description above includes illustrative examples, devices, and systems that embody the disclosed subject matter. In the description, for purposes of explanation, numerous specific details were set forth in order to provide an understanding of various embodiments of the disclosed subject matter. It will be evident, however, to those of ordinary skill in the art that various embodiments of the subject matter may be practiced without these specific details. Further, well-known structures, materials, and techniques have not been shown in detail, so as not to obscure the various illustrated embodiments.

As used herein, the term "or" may be construed in an inclusive or exclusive sense. Further, other embodiments will be understood by a person of ordinary skill in the art upon reading and understanding the disclosure provided. Further, upon reading and understanding the disclosure provided herein, the person of ordinary skill in the art will readily understand that various combinations of the techniques and examples provided herein may all be applied in various combinations.

As used herein, terms related to electrically-conductive elements or electrically-coupled elements broadly includes all types of electrical routing features configured to route electrical signals to or from various regions within a device or to regions of external devices (not shown). Thus, the term electrically-conductive elements includes, for example, internal electrical routing features and inter-device electrical connection and electrical routing features known in the art.

The term "substantially" or "about" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

Although various embodiments are discussed separately, these separate embodiments are not intended to be considered as independent techniques or designs. As indicated above, each of the various portions may be inter-related and each may be used separately or in various combinations.

Consequently, many modifications and variations can be made, as will be apparent to the person of ordinary skill in the art upon reading and understanding the disclosure provided herein. Functionally equivalent methods and devices within the scope of the disclosure, in addition to those enumerated herein, will be apparent to a skilled artisan from the foregoing descriptions. Portions and features of some embodiments may be included in, or substituted for, those of others. Such modifications and variations are intended to fall within a scope of the appended claims. Therefore, the present disclosure is to be limited only by the terms of the appended claims, along with the full scope of equivalents to which such claims are entitled. It is also to be understood that the terminology used herein is for the purpose of describing particular embodiments only and is not intended to be limiting.

The Abstract of the Disclosure is provided to allow the reader to quickly ascertain the nature of the technical disclosure. The abstract is submitted with the understanding that it will not be used to interpret or limit the claims. In addition, in the foregoing Detailed Description, it may be seen that various features may be grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

The Following Numbered Examples are Specific Embodiments of the Disclosed Subject Matter Example 1: In an exemplary embodiment, the disclosed subject matter is a combination multi-port hub. The exemplary combination multi-port hub includes at least two first connectors, at least two second connectors, an electronic circuit to detect a power level of the at least one type of electronic device, and a visible-light source. Each of the at least two first connectors is arranged to couple electronically to a USB-based digital-card reader. Each of the at least two second connectors is arranged to couple electronically to at least one type of electronic device type including devices types comprising one or more host computers and a power supply. The electronic circuit is arranged to detect a level of sourced-power available without measuring a level of current present of at least one of the at least two second connectors. The visible-light source is to indicate at least a pre-determined level of power being detected by the electronic circuit used to power each USB-based digital-card reader electronically coupled to the combination multi-port hub.

Example 2: The combination multi-port hub of Example 1, wherein the level of power level is pre-determined to be about 15 watts.

Example 3: The combination multi-port hub of either of the preceding Examples, wherein the at least two first connectors are plugs mounted to a first side of the combination multi-port hub, each of the at least two first connectors to mate directly with a respective receptacle of one of the USB-based digital-card readers.

Example 4: The combination multi-port hub of any one of the preceding Examples, wherein the at least two first connectors are each configured to receive data from and provide data to respective ones of the USB-based digital-card readers.

Example 5: The combination multi-port hub of any one of the preceding Examples, wherein the at least two second connectors are each configured to source power to respective ones of the USB-based digital-card readers.

Example 6: The combination multi-port hub of any one of the preceding Examples, further comprising an indicator-light aperture formed in the combination multi-port hub and proximate to the visible-light source.

Example 7: The combination multi-port hub of any one of the preceding Examples, wherein the electronic circuit to detect a power level of the at least one electronic device is based on a voltage comparator to determine a logic level of at least one configuration channel input from at least one of the at least two second connectors.

Example 8: The combination multi-port hub of any one of the preceding Examples, wherein the electronic circuit includes a light-emitting diode (LED) driver circuit to drive the visible-light source to emit a pre-selected color based on the pre-determined level of power being detected by the electronic circuit.

Example 9: The combination multi-port hub of any one of the preceding Examples, wherein the electronic circuit includes at least one pull-up resistor to provide the pre-determined level of power.

Example 10: The combination multi-port hub of any one of the preceding Examples, wherein the electronic circuit to detect a power level of the at least one electronic device is based on a logic circuit to determine whether at least one logic level is present on at least one configuration channel input from at least one of the at least two second connectors.

Example 11: In an exemplary embodiment, the disclosed subject matter is a combination multi-port hub. The exemplary combination multi-port hub includes at least two USB-connectors, at least two second connectors, an electronic circuit to detect a power level of the at least one type of electronic device, and an indicator-light aperture formed in the combination multi-port hub and proximate to a visible-light source. Each of the at least two USB-connectors is arranged to couple electronically to a USB-based digital-card reader. At least one of the at least two second connectors is a USB-connector to include a configuration channel connection, where the configuration channel is to carry a logic level indicative of a power lever present within the USB-connector. Each of the at least two second connectors is arranged to couple electronically to at least one electronic device type including device types comprising one or more host computers and a power supply. The electronic circuit is to detect a power level without measuring a level of current present of at least one of the at least two second connectors. The visible-light source is arranged to indicate at least a pre-determined level of power being detected by the electronic circuit used to power each USB-based digital-card reader electronically coupled to the combination multi-port hub.

Example 12: The combination multi-port hub of Example 11, wherein the at least two USB-connectors are plugs mounted to a first side of the combination multi-port hub, each of the at least two USB-connectors to mate directly with a respective USB-receptacle of one of the USB-based digital-card readers.

Example 13: The combination multi-port hub of either Example 11 or Example 12, wherein the at least two USB-connectors are each to receive data from and provide data to respective ones of the USB-based digital-card readers.

Example 14: The combination multi-port hub of any one of Example 11 through Example 13, wherein the at least two second connectors are each to source power to respective ones of the USB-based digital-card readers.

Example 15: The combination multi-port hub of any one of Example 11 through Example 14, wherein the electronic circuit to detect a power level of the at least one electronic device type is based on a voltage comparator to determine a logic level of the configuration channel input from at least one of the at least two second connectors.

Example 16: The combination multi-port hub of any one of Example 11 through Example 15, wherein the electronic circuit to detect a power level of the at least one electronic device is based on a logic circuit to determine whether at least one logic level is present on the configuration channel input from at least one of the at least two second connectors.

Example 17: In an exemplary embodiment, the disclosed subject matter is a method for using a combination multi-port hub. The exemplary method includes comparing a logic level of each of a first configuration channel (CC1) and a second configuration channel (CC2), received by the combination multi-port hub, to a reference voltage; and making a determination whether at least one of the CC1 and CC2 logic levels is at least equal to or greater than the reference voltage. Based on a determination that the at least one of the CC1 and CC2 logic levels is at least equal to or greater than the reference voltage; illuminating a first visible-light source on the combination multi-port hub. Based on a determination that the at least one of the CC1 and CC2 logic levels is at less than the reference voltage; illuminating a second visible-light source on the combination multi-port hub.

Example 18. The method of Example 17, further including, based on a determination that the at least one of the CC1 and CC2 logic levels is at less than the reference voltage: coupling a supplemental power supply to the combination multi-port hub; and illuminating the first visible-light source on the combination multi-port hub.

Example 19. The method of any one of Example 17 and Example 18, wherein the determination of whether at least one of the CC1 and CC2 logic levels is at least equal to or greater than the reference voltage provides an indication of a level of sourced-power available to the combination multi-port hub without measuring a level of current.

Example 20. The method of any one of Example 17 through Example 19, further including selecting the first visible-light source on the combination multi-port hub to be green; and selecting the second visible-light source on the combination multi-port hub to be red.

What is claimed is:

1. A combination multi-port hub, comprising:
   at least two first connectors, each of the at least two first connectors being configured to couple electronically to a USB-based digital-card reader;
   at least two second connectors, each of the at least two second connectors being configured to couple electronically to at least one type of electronic device type including device types comprising one or more host computers and a power supply;
   an electronic circuit to detect a power level of the at least one type of electronic device, the electronic circuit to detect a level of sourced-power available without measuring a level of current present of at least one of the at least two second connectors; and
   a visible-light source, the visible-light source being configured to indicate at least a pre-determined level of power being detected by the electronic circuit used to power each USB-based digital-card reader electronically coupled to the combination multi-port hub.

2. The combination multi-port hub of claim 1, wherein the level of power level is pre-determined to be about 15 watts.

3. The combination multi-port hub of claim 1, wherein the at least two first connectors are plugs mounted to a first side of the combination multi-port hub, each of the at least two first connectors being configured to mate directly with a respective receptacle of one of the USB-based digital-card readers.

4. The combination multi-port hub of claim 1, wherein the at least two first connectors are each configured to receive data from and provide data to respective ones of the USB-based digital-card readers.

5. The combination multi-port hub of claim 1, wherein the at least two second connectors are each configured to source power to respective ones of the USB-based digital-card readers.

6. The combination multi-port hub of claim 1, further comprising an indicator-light aperture formed in the combination multi-port hub and proximate to the visible-light source.

7. The combination multi-port hub of claim 1, wherein the electronic circuit to detect a power level of the at least one electronic device is based on a voltage comparator to determine a logic level of at least one configuration channel input from at least one of the at least two second connectors.

8. The combination multi-port hub of claim 1, wherein the electronic circuit includes a light-emitting diode (LED) driver circuit to drive the visible-light source to emit a pre-selected color based on the pre-determined level of power being detected by the electronic circuit.

9. The combination multi-port hub of claim 1, wherein the electronic circuit includes at least one pull-up resistor to provide the pre-determined level of power.

10. The combination multi-port hub of claim 1, wherein the electronic circuit to detect a power level of the at least one electronic device is based on a logic circuit to determine whether at least one logic level is present on at least one configuration channel input from at least one of the at least two second connectors.

11. A combination multi-port hub, comprising:
  at least two USB-connectors, each of the at least two USB-connectors being configured to couple electronically to a USB-based digital-card reader;
  at least two second connectors, at least one of the at least two second connectors being a USB-connector to include a configuration channel connection, the configuration channel to carry a logic level indicative of a power lever present within the USB-connector, each of the at least two second connectors being configured to couple electronically to at least one electronic device type including device types comprising one or more host computers and a power supply;
  an electronic circuit to detect a power level of the at least one electronic device, the electronic circuit to detect a power level without measuring a level of current present of at least one of the at least two second connectors; and
  an indicator-light aperture formed in the combination multi-port hub and proximate to a visible-light source, the visible-light source being configured to indicate at least a pre-determined level of power being detected by the electronic circuit used to power each USB-based digital-card reader electronically coupled to the combination multi-port hub.

12. The combination multi-port hub of claim 11, wherein the at least two USB-connectors are plugs mounted to a first side of the combination multi-port hub, each of the at least two USB-connectors being configured to mate directly with a respective USB-receptacle of one of the USB-based digital-card readers.

13. The combination multi-port hub of claim 11, wherein the at least two USB-connectors are each configured to receive data from and provide data to respective ones of the USB-based digital-card readers.

14. The combination multi-port hub of claim 11, wherein the at least two second connectors are each configured to source power to respective ones of the USB-based digital-card readers.

15. The combination multi-port hub of claim 11, wherein the electronic circuit to detect a power level of the at least one electronic device type is based on a voltage comparator to determine a logic level of the configuration channel input from at least one of the at least two second connectors.

16. The combination multi-port hub of claim 11, wherein the electronic circuit to detect a power level of the at least one electronic device is based on a logic circuit to determine whether at least one logic level is present on the configuration channel input from at least one of the at least two second connectors.

17. A method for using a combination multi-port hub, the method comprising:
  comparing a logic level of each of a first configuration channel (CC1) and a second configuration channel (CC2), received by the combination multi-port hub, to a reference voltage;
  making a determination whether at least one of the CC1 and CC2 logic levels is at least equal to or greater than the reference voltage, the determination of whether at least one of the CC1 and CC2 logic levels is at least equal to or greater than the reference voltage is to provide an indication of a level of sourced-power available to the combination multi-port hub without measuring a level of current;
  based on a determination that the at least one of the CC1 and CC2 logic levels is at least equal to or greater than the reference voltage;
  illuminating a first visible-light source on the combination multi-port hub; and
  based on a determination that the at least one of the CC1 and CC2 logic levels is at less than the reference voltage; illuminating a second visible-light source on the combination multi-port hub.

18. The method of claim 17, further comprising, based on a determination that the at least one of the CC1 and CC2 logic levels is at less than the reference voltage:
  coupling a supplemental power supply to the combination multi-port hub; and
  illuminating the first visible-light source on the combination multi-port hub.

19. The method of claim 17, further comprising:
  selecting the first visible-light source on the combination multi-port hub to be green; and
  selecting the second visible-light source on the combination multi-port hub to be red.

* * * * *